United States Patent [19]
Torguet

[11] 3,810,199
[45] May 7, 1974

[54] HIGH SPEED OPTICAL PRINTER
[75] Inventor: Roger J. Torguet, Paris, France
[73] Assignee: Thomson-CSF, Paris, France
[22] Filed: Nov. 20, 1972
[21] Appl. No.: 307,831

Related U.S. Application Data
[63] Continuation of Ser. No. 129,343, March 30, 1971, abandoned.

[30] Foreign Application Priority Data
Apr. 1, 1970 France.............................. 70.11705

[52] U.S. Cl. ................................................. 95/4.5
[51] Int. Cl. ........................................... B41b 21/26
[58] Field of Search ......... 95/4.5; 350/161; 340/378

[56] References Cited
UNITED STATES PATENTS
2,909,972  10/1959  De Lano ............................. 95/4.5
3,434,402  3/1969  McCall ................................. 95/4.5

OTHER PUBLICATIONS
Article from Applied Physics Letters, Oct. 1, 1967, Vol. 11, No. 7, "Pulse Compression by Bragg Diffraction of Light with Microwave Sound," pages 240–242.

Primary Examiner—John M. Horan
Attorney, Agent, or Firm—Cushman, Darby & Cushman

[57] ABSTRACT

The invention relates to optical printers for printing onto a photosensitive substrate a succession of characters arranged in parallel lines.

The optical printer according to the invention comprises a matrix of radiant energy sources capable of forming planar patterns representative of the characters to be printed; the pencils of radiant energy emerging from the matrix are transmitted toward the substrate across an afocal optical system wherein an acousto optical deviator element is positioned.

7 Claims, 3 Drawing Figures

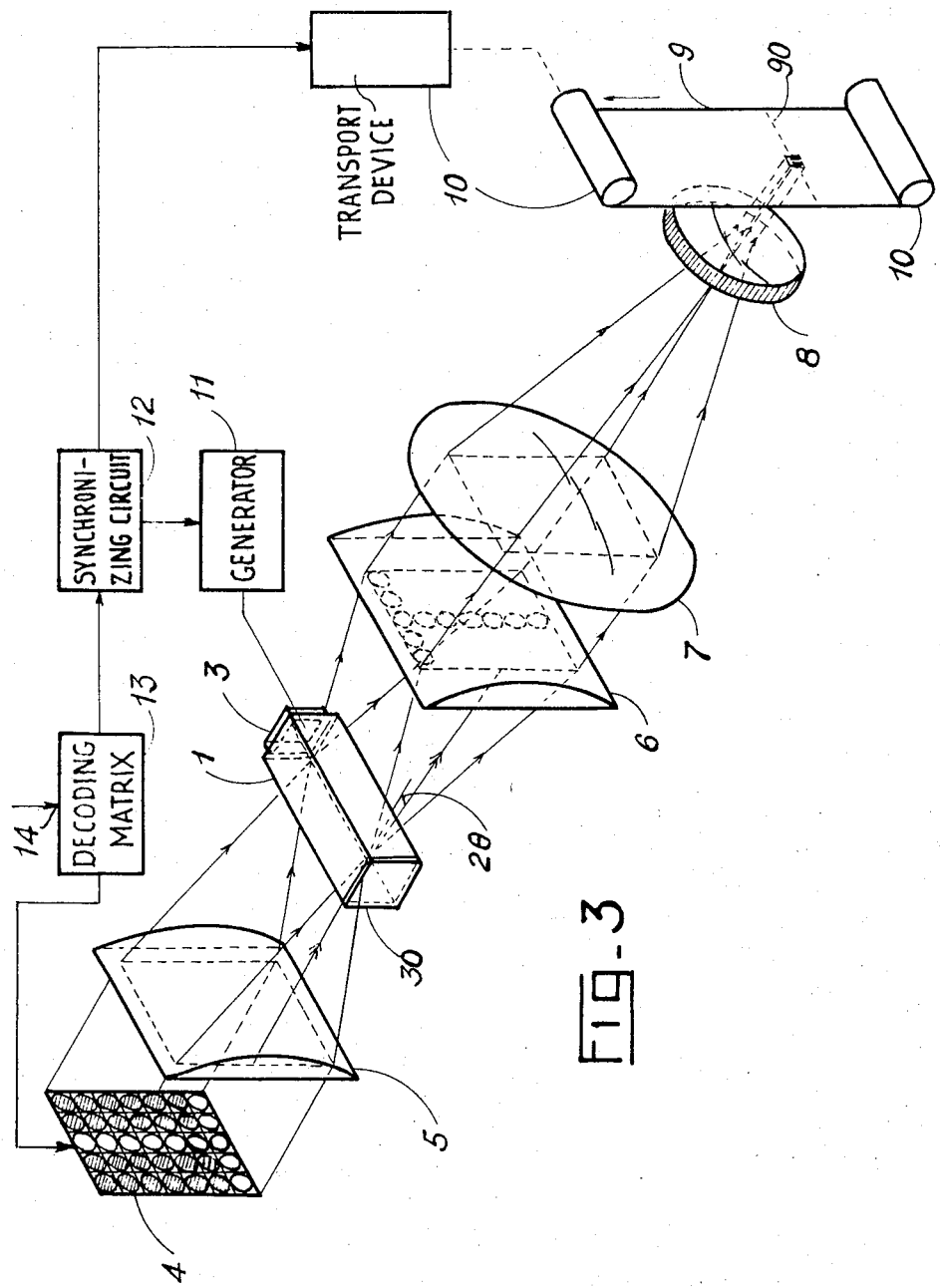

HIGH SPEED OPTICAL PRINTER

This is a continuation of application Ser. No. 129,343 filed Mar. 30, 1971, now abandoned.

The present invention relates to systems for optical impression of characters onto a photosensitive substrate.

In certain known kinds of optical printers, a light beam supplied from a light source is deflected in accordance with two mutually perpendicular axes so that the deflected beam is intercepted by a predetermined character belonging to a matrix of variable-transparency characters. Then, a second electro-optical deflector returns the beam emerging from the matrix in its initial direction and a third deflector, operating along a single deflection plane, enables the beam to successively print all the characters along a line.

This system is intricate and expensive, resulting in a very bulky apparatus.

The object of the present invention is to overcome these drawbacks by effecting deviation of a beam of radiant energy through the medium of an acousto-optical deviator.

According to the invention there is provided an optical printer for printing upon a photosensitive substrate successive characters arranged in parallel lines and respectively selected by a sequence of electrical control signals applied to the control input of said printer, said printer comprising: a matrix of radiant energy sources capable of respectively emitting parallel elementary pencils of radiant energy, decoding means selectively energizing said sources under the control of said control signals for supplying a succession of planar patterns respectively representative of said characters, an afocal optical system having a focal line and positioned for transmitting said pencils of radiant energy, acousto-optical deviator means positioned along said focal line and having an electrical control input; controlled frequency ultrasonic generator means having an output coupled to said electrical control input and control input; synchronizing means triggered by said decoding means and having an output connected to the control input of said ultrasonic generator means and a further output, and transport means for displacing said substrate in a direction substantially perpendicular to the deviation plane of said deviator means; said substrate being positioned for receiving the radiant energy emerging from said afocal system; said acousto-optical deviator means comprising a block of refringent material and an ultrasonic transducer positioned at one end of said block for propagating therein a beam of ultrasonic radiation; said pencils impinging onto said beam substantially at Bragg incidence; said transport means having a control input coupled to said further output.

For a better understanding of the invention and to show how the same may be carried into effect reference will be made to the ensuing description and drawings among which:

FIG. 3 is the diagram of an embodiment of the optical printer in accordance with the invention.

Figure 1:
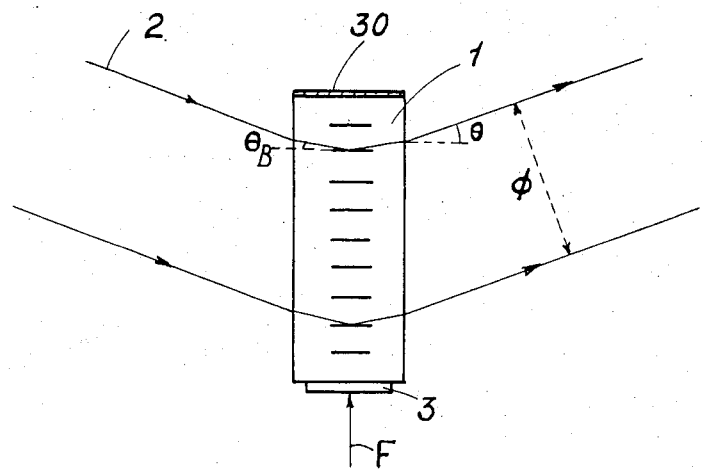
FIG. 1 illustrates the block diagram of an acousto-optical deviator.

FIG. 1, shows a block 1 of a refractory material transparent at the wavelength of the incident radiation beam 2 made up of parallel rays, ultrasonic plane waves of microwave frequency F travel along the block 1; they are generated at one extremity of the block. These ultrasonic waves, which can be either transverse or longitudinal waves, propagage through the block to the other extremity, where an layer 30 is arranged for preventing any backward reflection.

The ultrasonic waves inside the block 1 periodically modulate the refractive index of the material so that the incident radiation is diffracted by the ultrasonic grating thus created. The intensity of the diffracted portion of the incident radiant energy is at a maximum when the rays enters the interior of the block 1 at the Bragg angle $\theta_B$ in relation to the wave planes of the ultrasonic radiation, these latter planes being schematically indicated in the Figure by a series of parallel lines perpendicular to the direction of propagation of the ultrasonic waves. The Bragg angle $\theta_B$ is given by the well known relationship: $\theta_B \cong \lambda/2\Omega = (\lambda/2v_s) F$ where $\lambda$ is the wavelength of the incident light, $\Omega$ the wavelength of the ultrasonic waves inside the material, and $v_s$ their phase velocity.

It will be observed that the angle of incidence of the entry beam 2 can be maintained constant and the frequency F of the ultrasonic waves varied within a frequency range provided that the Bragg condition for the incident light beam is substantially respected at all times.

In this fashion, a light deflector is obtained which deflects the light through a variable angle:

$$2\theta \cong n(\lambda/v_s) F$$

where $n$ is the mean refractive index of the material in question.

Figure 2:
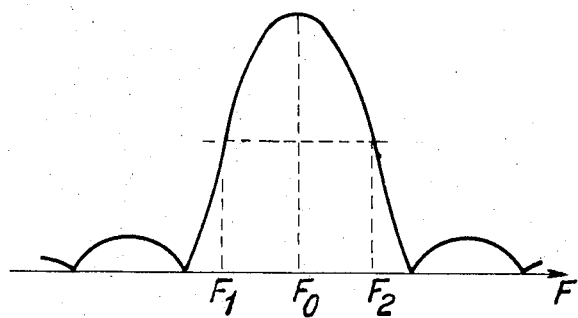
FIG. 2 illustrates an explanatory graph.

However, the ultrasonic frequency range within which this deflector can be operated, is limited by the fact that on departing from the strict Bragg condition, the intensity of the diffracted radiant energy varies. The graph of FIG. 2 illustrates the variations of the diffracted intensity as a function of the frequency of the ultrasonic wave. The frequency $F_o$ is the frequency at which the light beam is exactly at the Bragg angle.

If we take a 3 dB drop on each side of $F_o$, the useful range is limited by the minimum frequency $F_1$ and the maximum frequency $F_2$. Possible frequency variations between $F_1$ and $F_2$, in excess of an octave, are readily obtainable. This being so, FIG. 3 illustrates a diagram of an embodiment of the optical printer in accordance with the invention.

A matrix 4 of light sources, builds up in succession display of each character which is to be printed. This matrix can be constituted in each case with a lens which produces an elementary pencil of light of parallel rays, all the elementary pencils being mutually parallel. The selective lighting up of the diodes is controlled by a decoding matrix 13 which is supplied at its input 14 with control signals representing the characters which are to be successively printed, said signals being for example digital adresses. The matrix 13 in response to these signals, controls the lighting up of the diodes required in order to optically form the character to be printed. The connections between the various light sources and the matrix 13, have been indicated schematically by a single connection.

The light pencils produced by the sources of the matrix 4, are picked up by an afocal optical deviator, made up of cylindrical lenses 5 and 6 and the acousto-optical deviator cell 1 hereinbefore described. The two lenses 5 and 6 form an afocal optical system. The acousto-optical cell 1 is located in this instance along the focal line common to lenses 5 and 6, so that all the light pencils emitted by the matrix 4 pass through the material (in this case a quartz crystal), of the block 1, substantially at the Bragg angle.

The angle $2\theta$ being substantially the one through which all the light rays are deviated, is a function of the frequency of a microwave generator 11 connected to the piezoelectric transducer 3. The generator 11 has a control input connected to a synchronizing circuit 12 which controls the sequential setting of the frequency of the generator 11 to a series of discrete values whose number is equal to the number of characters to be recorded per line, in the text being printed. The synchronizing circuit 12 is triggered by the decoding matrix 13.

The elementary parallel-ray light pencils emanating from the lens 6, are picked up by an optical projection system made up of convergent lens 7 and divergent lens 8 which form an erect image telescope, the image focus of the lens 7 being coincidental with the object focus of the lens 8.

The deviation of the light beams by the afocal deflector 5-1-6 is amplified by the optical projection system in the ratio of the respective focal lengths of the lenses 7 and 8 and the dimensions of the beams reduced in the desired ratio, the beams being projected in order to form the relevant character along a line 90 on a photosensitive substrate 9. The latter is driven at constant speed by a transport device 10 whose speed of operation is controlled by the circuit 12.

The operation of the system is as follows:

The orientation of the deflector 1 is adjusted in order to approximate as closely as possible to the Bragg angle for the centre frequency $F_o$ of the generator 11. Those skilled in the art will be well aware that the amount of diffraction produced by an optical system is proportioned to the wavelength of the light it transmits, and inversely proportional to the dimensions of the exit pupil of the system. Here, in the plane of deviation of the light beam by the deflector 1, the diffraction angle will be given by $\lambda/\phi$, $\phi$ being the width of the beam (FIG. 1). Under these circumstances, if we call F the frequency range used, the maximum range of deivation obtainable will be:

$$2 \Delta\theta = n \lambda/v_s \Delta F$$

and the highest number $N$ of angular directions which can be distinctly observed is given by:

$$N = n \phi/v_s F.$$

A number of distinct angular directions in the order of 500 or more is obtained, even in the most stringent case where the characters to be recorded are 1's (minimum beam width), by using a quartz block 2 cm long and a frequency range of 1 octave about 600 Mc/s.

Thus, it is quite feasible to record lines of 80 to 100 characters which imply the same number of predetermined deflection directions and consequently also the same number of frequency values on the part of the generator 11.

For the recording of each line, the synchronizing circuit 12 synchronises the successive frequency values of the generator 11 (in this case from the lowest value to the highest value, considering recording from left to right along the line), with the successive patterns by the matrix 4, of the characters which are to be recorded.

At the same time, it synchronises the speed of transport of the substrate 9 so that the return to the start of the next line is effected at the desired point. Accordingly, the substrate 9 can be given a certain inclination with respect to the deviation plane so that the recorded line looks horizontally disposed on the substrate.

One advantage of using cylindrical lenses for the afocal system 5–6 is that the beam passing through the deflector 1 retains a maximum width.

In one actual embodiment, a matrix of light sources 1.8 × 1.8 cm was used. The lens 5 was located 15 cm from the deviator 1 and made up of a quartz crystal 1 cm in length and 6 × 6 mm in section; the centre frequency of excitation was 600 Mc/s. Finally, the focal lengths of the lenses 7 and 8 were respectively 1 m and 5 cm.

Self-evidently, the embodiments described here are in no way limitative of the scope of the invention.

What I claim is:

1. An optical printer for printing upon a photosensitive substrate successive characters arranged in parallel lines and respectively selected by a sequence of electrical control signals applied to the control input of said printer, said printer comprising: a matrix of radiant energy sources capable of respectively emitting parallel elementary pencils of radiant energy, decoding means selectively energizing said sources under the control of said control signals for supplying a succession of planar patterns respectively representative of said characters, an afocal cylindrical optical combination having a common focal line and positioned for transmitting said pencils of radiant energy, acoustooptical deviator means positioned along said focal line and having an electrical control input; controlled frequency ultrasonic generator means having an output coupled to said electrical control input and a control input; synchronizing means triggered by said decoding means and having an output connected to the control input of said ultrasonic generator means and a further output, and transport means for displacing said substrate in a direction substantially perpendicular to the deviation plane of said deviator means; said substrate being positioned for receiving the radiant energy emerging from said afocal cylindrical optical combination said acousto-optical deviator means comprising a block of refringent material and an ultrasonic transducer positioned at one end of said block for propagating therein a beam of ultrasonic radiation; said pencils impinging onto said beam substantially at Bragg incidence; said transport means having a control input coupled to said further output.

2. An optical printer as claimed in claim 1, wherein optical telescope means are positioned between said afocal cylindrical optical combination and said substrate.

3. An optical printer as claimed in claim 1, wherein said telescope means comprise a converging lens receiving the radiant energy emerging from said afocal cylindrical optical combination and a further lens positioned between said converging lens and said substrate.

4. An optical printer as claimed in claim 1, wherein said afocal cylindrical optical combination comprises a first and a second cylindrical converging lens; the primary focal line of said second cylindrical lens coinciding with the secondary focal line of said first cylindrical converging lens.

5. An optical printer as claimed in claim 1, wherein said refringent material is quartz.

6. An optical printer as claimed in claim 1, wherein said generator means comprise a frequency modulated microwave oscillator.

7. An optical printer as claimed in claim 2, wherein said optical telescope means is an afocal optical combination.

* * * * *